UNITED STATES PATENT OFFICE.

ARTHUR LÜTTRINGHAUS, OF MANNHEIM, AND WILHELM KOCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF PRODUCING KETONIC COMPOUNDS.

1,220,248.  Specification of Letters Patent.  Patented Mar. 27, 1917.

No Drawing.  Application filed October 1, 1914.  Serial No. 864,419.

*To all whom it may concern:*

Be it known that we, ARTHUR LÜTTRINGHAUS, Ph. D., and WILHELM KOCH, Ph. D., chemists, citizens of the German Empire, residing at Mannheim and Ludwigshafen-on-the-Rhine, respectively, Germany, have invented new and useful Improvements in Processes of Producing Ketonic Compounds, of which the following is a specification.

It is known that tetraalkyl-4.4'-diamino-thio-benzophenone can be obtained by heating tetraalkyl-4.4'-diamino-diphenyl-methane with sulfur (see German Letters Patent No. 57,963 and Wallach, *Annalen der Chemie* vol. 259, page 303), but the reaction gives rise to only a small yield of the desired product, and the purification of the said product presents great difficulties.

We have now discovered that we can obtain good technical yields of 4.4'-diamino-diaryl-ketonic bodies which are valuable intermediate products in the manufacture of coloring matters by heating 4.4'-diamino-diaryl-methane bodies with a polysulfid. Under the term ketonic bodies, we include both the ketones which contain oxygen attached to the ketonic carbon atom, and also the corresponding thioketones, which contain sulfur attached to the ketonic carbon atom. The products which we obtain according to the process of our invention vary according to the initial material which is treated with the said polysulfid. Thus by treating N-substituted 4.4'-diamino-diaryl-methane bodies with a polysulfid, the corresponding N-substituted 4.4'-diamino-diaryl-thio-ketones are produced, whereas if a 4.4'-diamino-diaryl-methane body, not substituted in the amino groups be treated with a polysulfid, the corresponding diamino-diaryl-ketone is obtained in good yield.

The following examples will serve to illustrate further the nature of our invention, which, however, is not confined to these examples. The parts are by weight.

Example 1.

Boil together in a reflux apparatus 25.4 parts of tetra-methyl-4.4'-diamino-diphenyl-methane, 29 parts of sulfur and 24 parts of crystallized sodium sulfid until a test portion shows that the methane base has almost, or even entirely, disappeared. Then extract the mixture with a boiling dilute solution of sodium sulfid in order to remove the polysulfid and sulfur and then treat the residue with alcohol, or with dilute hydrochloric acid in order to extract any methane base which may be present. An excellent yield of tetra-methyl-4.4'-diamino-thio-benzophenone is obtained and after being washed with alcohol melts at about 202° to 204° C.

Example 2.

Boil together for about eighty hours in a reflux apparatus 25.4 parts of symmetrical dimethyl-4.4'-diamino-3.3'-dimethyl-diphenyl-methane, 48 parts of crystallized sodium sulfid and 38 parts of sulfur and work up the product as described in the foregoing Example 1, whereupon a very good yield of symmetrical dimethyl-4.4'-diamino-3.3'-dimethyl-thio-benzo-phenone is obtained as a red crystalline powder melting at about 189° C.

In a similar manner tetra-ethyl-diamino-thio-benzophenone can be obtained from tetra-ethyl-4.4'-diamino-diphenyl-methane, and other N-substituted 4.4' diamino-diaryl-thioketones can be prepared.

Example 3.

Prepare a mixture from 480 parts of crystallized sodium sulfid and 320 parts of sulfur, and evaporate off so much water that the residue boils at about 125° C. and then introduce 198 parts of 4.4'-diamino-diphenyl-methane, then boil the whole for about fifty hours while stirring in a reflux apparatus, and extract the product first with a dilute sodium sulfid solution and then with a cold mixture containing about 2000 parts of water and 360 parts of 20% hydrochloric acid. In this way a solution is obtained of 4.4'-diamino-diphenyl-ketone hydrochlorid. By the careful addition of small quantities of alkali to this solution, impurities can be precipitated and should then be filtered off, whereupon on the further addition of alkali to the filtrate, 4.4'-diamino-diphenyl-ketone is precipitated and is obtained in excellent yield. The product can, if desired, be further purified by grinding it with concentrated hydrochloric acid, whereby the hydrochlorid is formed, then filtering this off and washing it with more hydrochloric acid. The hydrochlorid can then be dissolved in water and the base precipitated by means of alkali, whereupon small needles, melting at about 241° C., are produced.

*Example 4.*

Boil together for fifty hours in a reflux apparatus at about 135° C. 226 parts of 4.4'-diamino-3.3'-dimethyl-diphenyl-methane, 480 parts of crystallized sodium sulfid and 448 parts of sulfur, and work up the product as described in the foregoing Example 3, whereupon the hitherto unknown 4.4'-diamino-3.3'-dimethyl-diphenyl-ketone is obtained as almost white needles. These are difficultly soluble in hot benzene and chloroform, but more easily soluble in boiling alcohol and ethyl acetate. On recrystallization from alcohol it can be obtained in the form of prismatic crystals which melt at 207° to 210° C.

*Example 5.*

Boil together in a reflux apparatus for eighty hours at about 125° to 130° C. 133 parts of 4.4'-diamino-3.3'-dichlor-diphenyl-methane (*Journal für Praktische Chemie*, vol. 79, page 493) 360 parts of crystallized sodium sulfid and 336 parts of sulfur. Then extract the reaction mixture several times with boiling sodium sulfid solution in order to remove excess of sulfur and then, if necessary, extract any unaltered initial material by treatment with very dilute hydrochloric acid at about 50° C. and finally wash the product with water containing a little ammonia. The product consists of almost pure 4.4'-diamino-3.3'-dichlor-benzophenone and can be purified by recrystallization from dichlorbenzene and thus be obtained in the form of needles melting at 256° C. The product is a weak base and dissolves with difficulty in cold dilute hydrochloric acid, but on being boiled with concentrated hydrochloric acid, it gradually goes into solution; on diluting this solution, dissociation takes place and the base is precipitated again. It is difficultly soluble in hot benzene, chloroform and alcohol, but more easily soluble in dichlorbenzene, and trichlorbenzene.

*Example 6.*

Prepare a mixture from 360 parts of crystallized sodium sulfid and 432 parts of sulfur and evaporate off so much water that the residue boils at about 140° centigrade and then add 165 parts of the disodium salt of 4.4'-diamino-diphenyl-methane-3.3'-dicarboxylic acid (*Annalen der Chemie*, vol. 324, page 122 *et seq.*), then boil the whole for about 100 hours in a reflux apparatus while stirring. Dilute the reaction mixture with water and acidify it, while boiling, with hydrochloric acid, filter off the precipitate and extract with warm dilute sodium carbonate solution. On acidifying the hot alkaline filtrate with hydrochloric acid, 4.4'-diamino-benzophenone-3.3'-dicarboxylic acid is precipitated. The crude acid can be purified by boiling it with an aqueous suspension of magnesia, whereupon the magnesium salt of the acid goes into solution, while the impurities remain undissolved. On acidifying the filtrate, the acid is obtained in the form of a light yellow precipitate which, after drying, melts under decomposition at about 305° C. The dicarboxylic acid is practically insoluble in very dilute hydrochloric acid and dissolves with difficulty in hot concentrated hydrochloric acid giving a solution from which on cooling the acid separates out again. It is easily soluble in caustic alkali solution and in alkali carbonate solution.

Now what we claim is:—

1. The process of producing a 4.4'-diamino-diaryl-ketonic body by heating a 4.4'-diamino-diaryl-methane body with a polysulfid.

2. The process of producing an N-substituted 4.4'-diamino-diaryl-thioketone by heating an N-substituted 4.4'-diamino-diaryl-methane with a polysulfid.

3. The process of producing tetra-methyl-4.4'-diamino-diphenyl-thioketone by heating a tetra-methyl-4.4'-diamino-diphenyl-methane with a polysulfid.

4. The process of producing 4.4'-diamino-3.3'-dimethyl-diphenyl-ketone by heating 4.4'-diamino-3.3'-dimethyl-diphenyl-methane with alkali polysulfid.

5. As a new body 4.4'-diamino-3.3'-dimethyl-diphenyl-ketone, which consists when pure of almost white crystals which are difficultly soluble in hot benzene and chloroform, more easily soluble in boiling alcohol and ethyl acetate, and which melt at about 207° to 210° C.

In testimony whereof we have hereunto set our hands in the presence of two subscribing witnesses.

ARTHUR LÜTTRINGHAUS.
WILHELM KOCH.

Witnesses:
JULIUS LEDERER,
H. MERLE COCHRAN.